United States Patent
Basavanhally (12)

(10) Patent No.: US 6,370,311 B1
(45) Date of Patent: Apr. 9, 2002

(54) HERMETIC OPTICAL FIBER ARRAYS AND METHODS FOR MAKING SAME

(75) Inventor: Nagesh Ramamoorthy Basavanhally, Skillman, NJ (US)

(73) Assignees: Lucent Technologies Inc., Murray Hill, NJ (US); Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/550,844

(22) Filed: Apr. 17, 2000

(51) Int. Cl.[7] .................................................. G02B 6/00
(52) U.S. Cl. ........................ 385/139; 385/137; 385/119
(58) Field of Search .................... 385/139, 136, 385/137, 116, 119

(56) References Cited

U.S. PATENT DOCUMENTS

| | | |
|---|---|---|
| 5,135,590 A | 8/1992 | Basavanhally et al. ....... 156/64 |
| 5,185,846 A | 2/1993 | Basavanhally et al. ..... 385/137 |
| 5,862,278 A | * 1/1999 | Brauch et al. ................ 385/34 |

* cited by examiner

*Primary Examiner*—Cassandra Spyrou
*Assistant Examiner*—Christopher S. Maxie

(57) ABSTRACT

In accordance with the invention, a hermetic optical fiber array comprises a substrate having a planar surface including an array of perforations for receiving optical fibers, a plurality of fibers having cores disposed in the perforations, the fibers bonded to the substrate with a set of fiber ends substantially coplanar with the surface, and a sealing coating disposed on the planar surface and co-planar ends, the sealing coating covering the substrate/fiber joints but having openings to the cores of fibers in the array. The fiber array can be bonded within a hollow tubular fiber array housing, and the fiber array housing, in turn, can be adapted to support a microlens in spaced relation to the coplanar arrayed fiber ends and to hermetically attach to an apertured system housing.

9 Claims, 4 Drawing Sheets

HERMETIC OPTICAL FIBER ARRAYS AND METHODS FOR MAKING SAME

FIELD OF THE INVENTION

This invention relates to optical fiber arrays and, in particular, to a hermetically sealed array presenting the cores of the fibers in a sealed planar array. It also includes methods for making such arrays.

BACKGROUND OF THE INVENTION

One of the major advances in communications in recent years has been the increased use of optical fiber systems for carrying large quantities of information with low distortion and low cost over great distances. Optical systems are also very promising for computing and switching because of the inherently high speeds at which they operate. For these reasons, considerable work has been expended to develop techniques for operating directly on light, without converting the light to electrical energy. The use of such devices will depend to a great extent on the facility with which they can be made.

Optical fibers typically comprise a core of relatively high refractive index glass surrounded by low refractive index glass cladding. The paper, "All-Optical Implementation of a 3-D Crossover Switching Network," by T. J. Cloonan et al., IEEE *Photonics Technology Letters,* Vol. 2, No. 6, June 1990, pp. 438–440, describes a free-space photonics switch which takes light from the end of a bundle of optical fibers, performs desired switching functions, and then projects the light into the end of a second array of optical fibers. The optical fiber ends of each bundle form a matrix configuration which must be accurately registered with the other apparatus. Because each fiber core is small (typically about 8 $\mu$m), it is important that the ends of each optical fiber bundle be positioned with great accuracy. Fixing the ends of an optic fiber bundle in a desired matrix configuration with the precision needed is difficult and painstaking.

Techniques are now known that can be used to arrange the ends of optical fibers in a desired configuration. See U.S. Pat. No. 5,135,590 issued to applicant Basavanhally et al. on Aug. 4, 1992 and U.S. Pat. No. 5,185,846 issued to Basavanhally et al. on Feb. 9, 1993. These techniques are relatively inexpensive, do not require a great deal of operator skill, and are dependably accurate to within micron or sub-micron dimensions. These techniques involve providing a perforated substrate with a precise array of perforations into which fibers of the bundle are inserted and bonded.

While these techniques have worked well in many applications, in some applications subject to moist environments, water can penetrate the epoxy bonding material and deteriorate the fibers and other optical components of the system.

SUMMARY OF THE INVENTION

In accordance with the invention, a hermetic optical fiber array comprises a substrate having a planar surface including an array of perforations for receiving optical fibers, a plurality of fibers having cores disposed in the perforations, the fibers bonded to the substrate with a set of fiber ends substantially coplanar with the surface, and a sealing coating disposed on the planar surface and co-planar ends, the sealing coating covering the substrate/fiber joints but having openings to the cores of fibers in the array.

The fiber array can be bonded within a hollow tubular fiber array housing, and the fiber array housing, in turn, can be adapted to support a microlens in spaced relation to the coplanar arrayed fiber ends and to hermetically attach to an apertured system housing.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
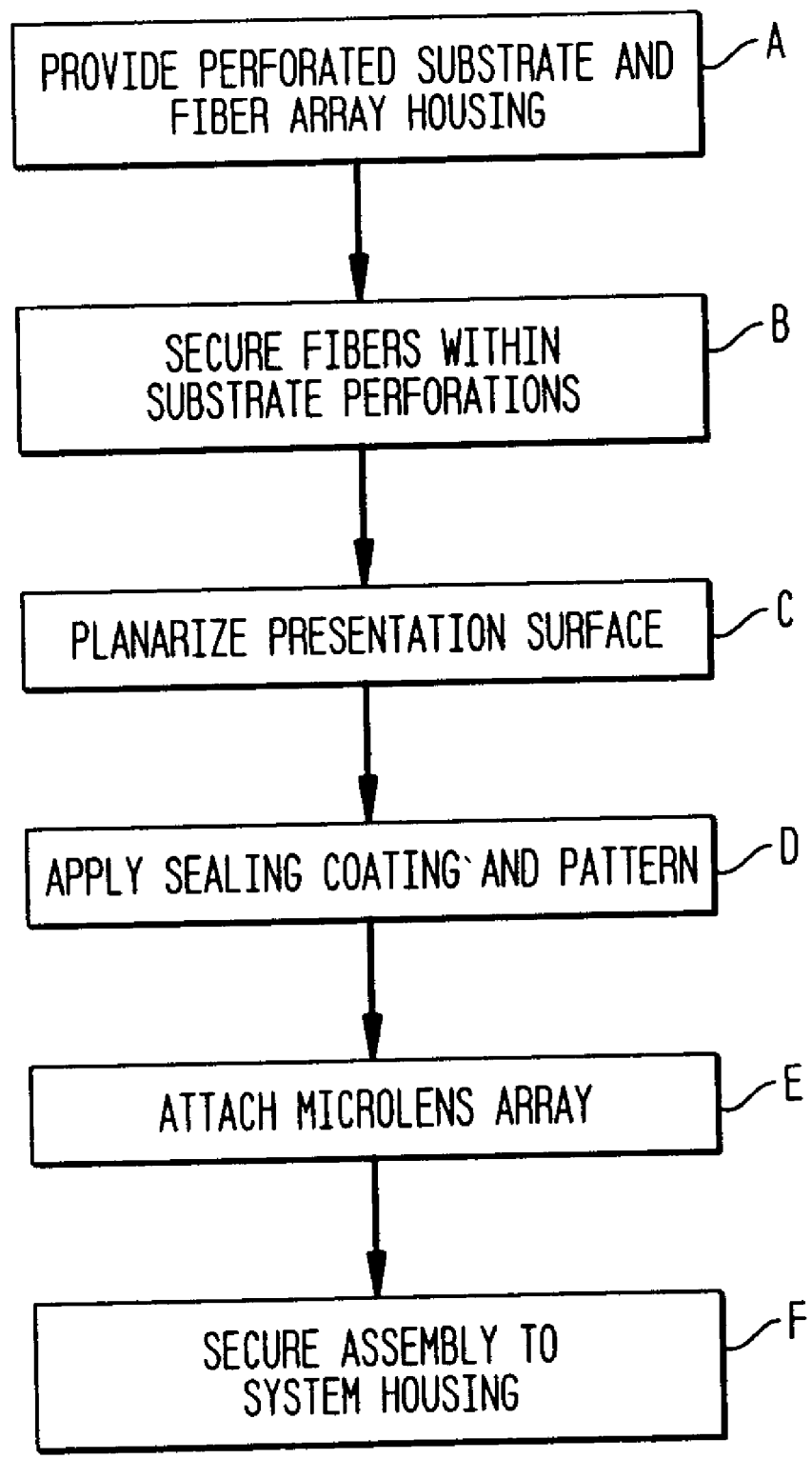
FIG. 1 is a schematic flow diagram illustrating the steps in making a hermetic fiber array.

Referring to the drawings, FIG. 1 is a schematic flow diagram illustrating the steps in making a hermetic fiber array. The first step shown in Block A of FIG. 1 is to provide a perforated substrate and a fiber array housing. The substrate is preferably bonded to an end of the housing.

Figure 2:
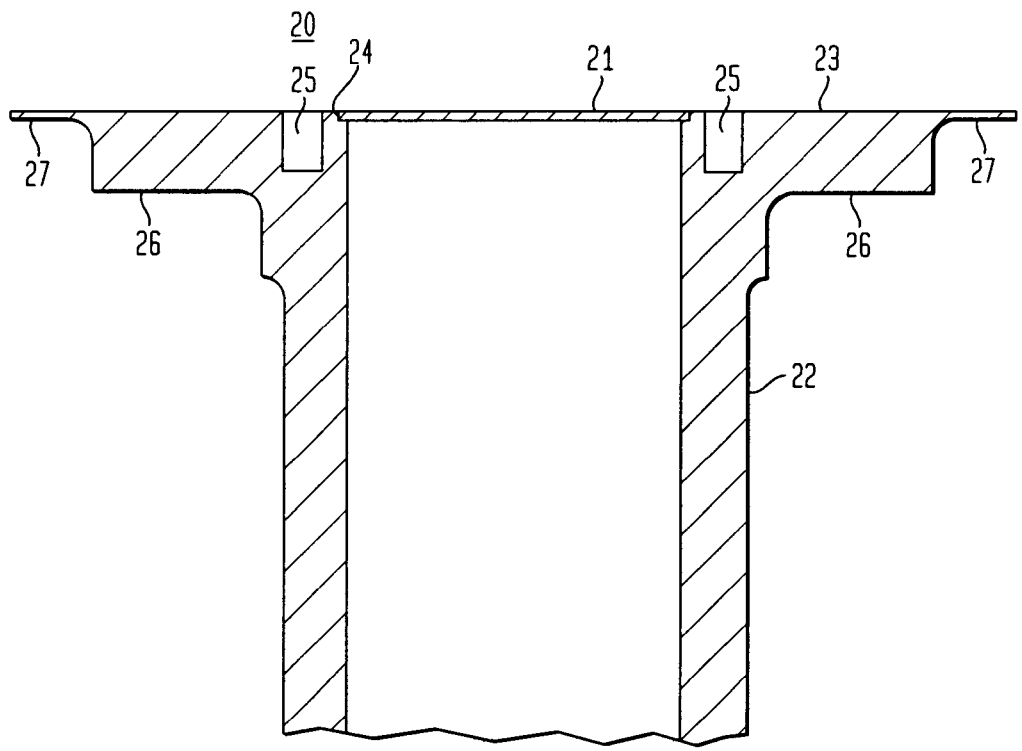
FIG. 2 is a schematic cross section showing the assembly of a perforated substrate and a fiber array housing.

FIG. 2 is a schematic cross section showing the assembly 20 of a perforated substrate 21 and a fiber array housing 22. Advantageously the housing 22 is a hollow metal tube with one end 23 having an interior recessed shoulder 24 providing support for and fitting engagement with substrate 21. The housing end 23 can also be provided with threaded holes 25 to facilitate attachment of a microlens assembly (not shown) and one or more concentric flanges 26, 27 to assist in attachment to a system housing (not shown).

The perforated substrate 21 is a substrate containing an array of perforations for receiving optical fibers. It can be made of metal, glass or other moisture-resistant material but is preferably made of silicon. It is typically five hundred micrometers thick and, for receiving standard 125 micrometer diameter optical fiber, has perforations greater than about 126 micrometers. The perforations are disposed in a precise array with a representative center-to-center spacing of 262 micrometers. Such substrates and methods for making them are described in detail in the aforementioned U.S. Pat. Nos. 5,135,590 and 5,185,846 issued to applicant Basavanahally et al., which are incorporated herein by reference. The substrate 21 is preferably bonded to housing 22 in preparation for the next step.

The next step shown in Block B is to secure optical fibers into the perforations of the substrate. The fibers are inserted into the perforations and can be bonded in position by epoxy. To ensure that the fibers are presented in a planar array, a presentation surface of the assembly can be planarized, as by cutting the fibers near the presentation surface and polishing, thereby ensuring that one set of fiber ends and the substrate are coplanar. Details concerning methods of expedient insertion of optical fibers in such substrates and formation of a coplanar array are set forth in the aforementioned U.S. Pat. Nos. 5,135,590 and 5,185,846.

The third step (Block C) is to form a patterned coating of sealing material on the planarized presentation surface. Such a coating is needed because epoxy allows moisture to penetrate. The coating is patterned so that it exposes the core regions of the coplanar fiber ends but covers and seals the fiber/substrate joint. The preferred sealing material is a thin coating of metal such as aluminum. If the substrate is silicon, it is advantageous to apply an adhesion layer such as titanium before depositing the aluminum. The sealing layer is then patterned, using well-known photolithographic techniques, to provide an array of openings over the fiber cores. For a standard 8 micrometer core, the openings can have a diameter of 20–30 micrometers centered over the cores.

Figure 3:
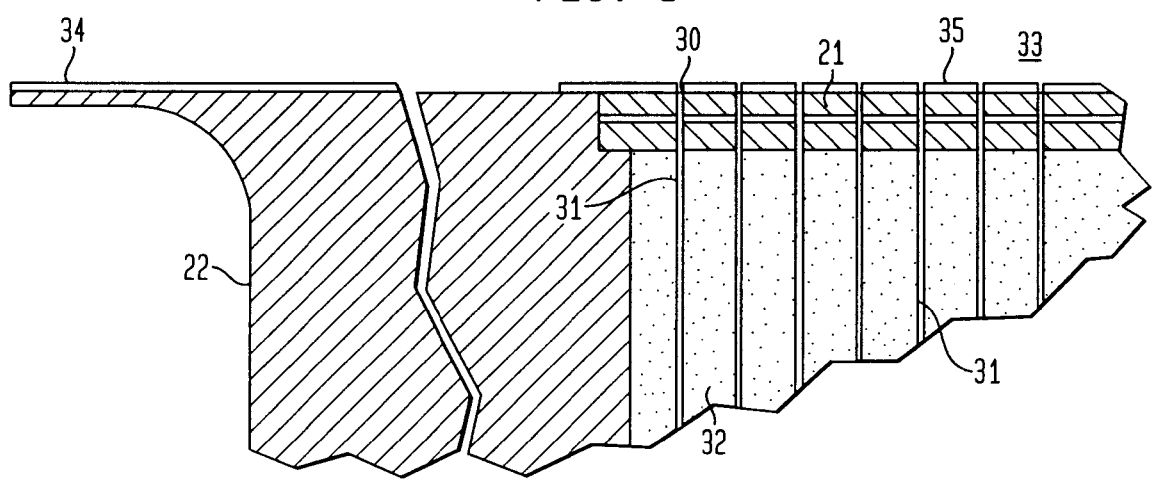
FIG. 3 is a schematic cross section illustrating an array of fibers bonded within the perforated substrate and sealed against moisture.

FIG. 3 is a schematic partial cross section of the assembly at this stage of the process showing a silicon substrate 21 having perforations 30 containing an optical fibers 31. The fibers are bonded in position by epoxy 32. On a presentation surface 33 the ends of fibers 31 are coplanar with the substrate, and a sealing coating 35 of aluminum is disposed on the presentation surface 33 with openings exposing the fiber cores but sealing the fiber/substrate joints. The sealing coating 35 also covers the joint between the substrate 21 and the fiber array housing 22. Advantageously the peripheral region of surface 33 is also provided with a solderable coating 34 such as Ti (4000 Å): Pt(2000 Å): Au(5000 Å) to facilitate sealing to a system housing.

Figure 4:
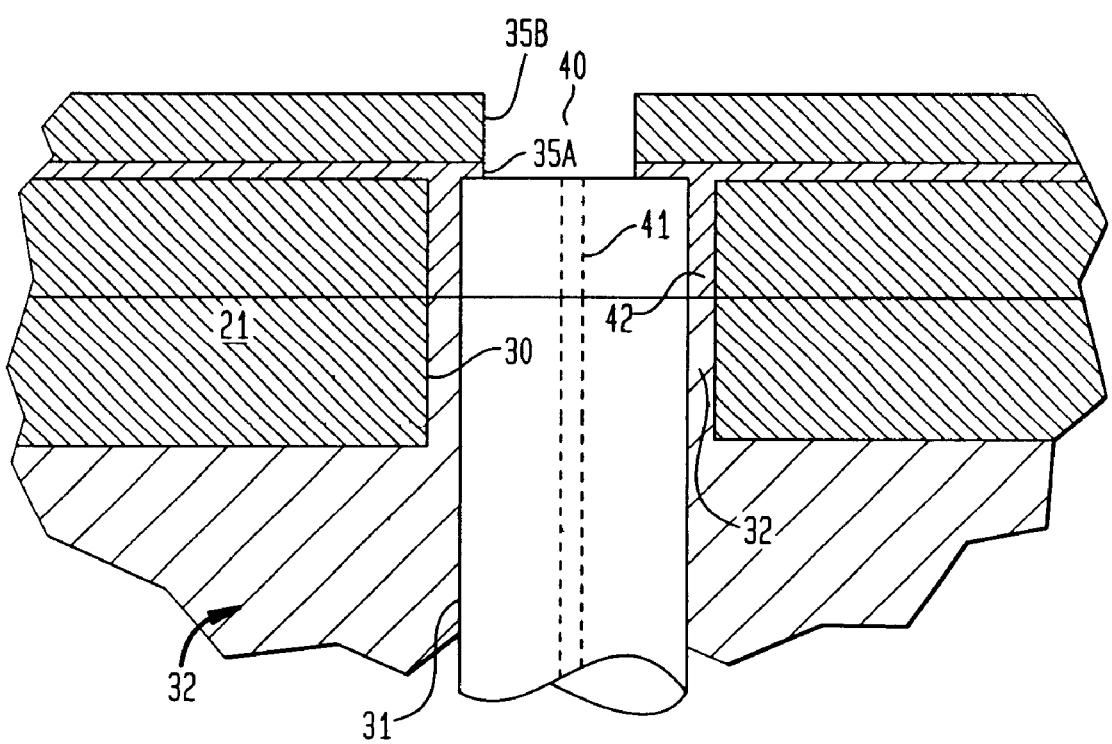
FIG. 4 is an enlarged view of a portion of FIG. 3 showing the sealing coating in relation to an individual fiber.

FIG. 4, which is a further enlargement of a portion the substrate/fiber assembly shows a fiber 31 secured within perforation 30 by epoxy 32. In this instance the sealing coating comprises an adhesive coating 35A of titanium (about 1000 angstroms) and a coating 35B of aluminum (about 3 micrometers). The opening 40 exposes the fiber core 41 but seals the fiber/substrate joint 42. Typically the core is about 8 micrometers in diameter, and the opening is about 20–30 micrometers.

The fifth step (FIG. 1, Block E) is optional in some applications. It is to secure a microlens array parallel to the presentation surface. The microlens array provides an array of lenses corresponding to the array of fibers so that each fiber has a lens. Such microlens arrays are described in detail in K. Merseran et al. "Fabrication and Measurement of Fused Silica Microlens Arrays", *Proc. SPIE,* No. 1751, p. 229–233 (1992). As a preliminary step, a spacer ring with ground parallel surfaces can be attached to the assembly end via screws into the threaded holes. The microlens array can be placed on the spacer and held temporarily in place by vacuum. The lens array can be actively aligned by monitoring the optical signal and secured in place using epoxy. The vacuum is released after the epoxy cure.

Figure 5:
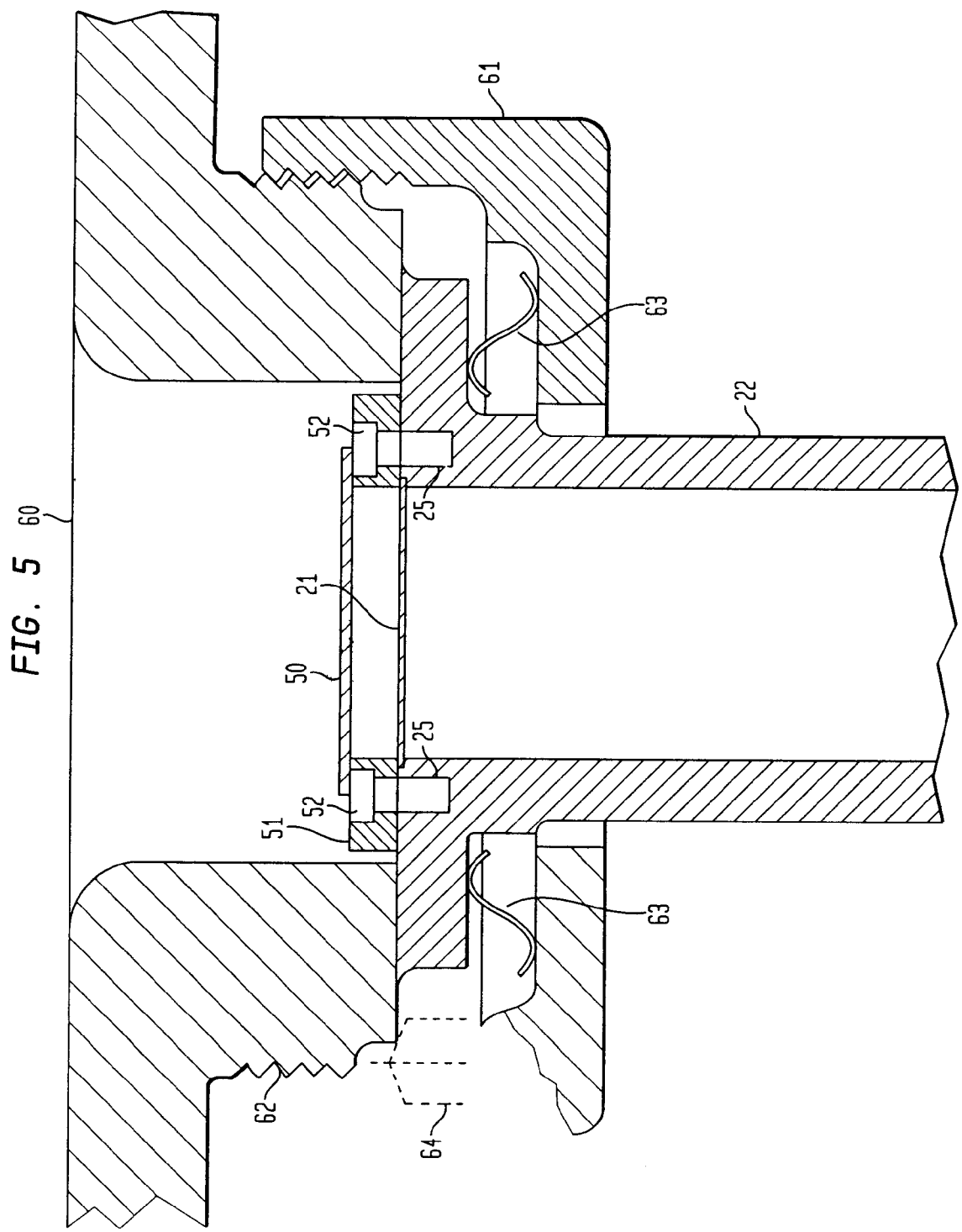
FIG. 5 is a simplified schematic cross section showing how a microlens array can be disposed on the fiber array housing and how the array housing can be hermetically connected to a system housing.

FIG. 5 is a schematic cross section of the assembly showing a microlens array 50 bonded parallel to the substrate 21 with the lens array in proper registration with the optical fiber ends. The microlens array 50 is bonded to a spacer ring 51 secured to the assembly tube by screws 52 into threaded holes 25. The optical fibers have been omitted from FIG. 5 for clarity.

The final step (Block F) is to hermetically attach the fiber assembly housing to an optical system housing. This can be accomplished by coating a peripheral end portion of the fiber assembly housing and a corresponding receiving portion of the optical system housing to make them solderable. The fiber assembly housing periphery can be coated with Ti/Pt/Au to make it solderable, and the system housing can be plated with nickel. Using a solder preform ring (e.g. Au/Sn or Pb/Sn) between the two housings (not shown), a solder seal can be formed using a beam sealer (resistance welder). Because the seam sealing requires a thin metal flange (<0.010" thick) it is desirable to mechanically secure the two housings, as by a backing nut.

FIG. 5 shows the fiber assembly housing soldered to the system housing 60. A backing nut 61 secures to receiving threads 62 of housing 60. A wave spring 63 can be used to apply a uniform axial load. In case a large axial load is needed, a thrust bearing (not shown) can be inserted to minimize the twisting load on the fiber array that occurs while tightening the nut 61. A seam sealer 64 would be applied as shown to effect the peripheral soldering. Alternatively, the fiber housing and the system housing can be soldered together by inserting an indium gasket between them and heating.

It is to be understood that the above-described embodiments are illustrative of only a few of the many possible specific embodiments which can represent applications of the principles of the invention. Numerous and varied other arrangements can be readily devised by those skilled in the art without departing from the spirit and scope of the invention.

What is claimed:

1. A method of making a hermetic array of optical fibers comprising the steps of:

providing a plurality of optical fibers and a perforated substrate having an array of perforations for receiving the optical fibers;

securing the optical fibers within the perforations of the substrate;

planarizing the substrate and optical fibers to provide a planar surface presenting an array of optical fiber ends, each end including a fiber core region peripherally surrounded by a cladding region;

applying a hermetic sealing coating to the planar surface to seal the boundaries between the fibers and the perforations and patterning the sealing coating to selectively expose the core regions of the fiber ends.

2. The method of claim 1 including the steps of:

providing a fiber array assembly tube for peripherally surrounding the optical fibers; and securing the perforated substrate to an end of the assembly tube.

3. The method of claim 2 wherein the perforated substrate is secured to the end of the assembly tube prior to securing the optical fibers in the substrate.

4. The method of claim 3 wherein the hermetic sealing coating additionally seals the boundary between the substrate and the assembly tube.

5. The method of claim 2 further comprising the steps of:

providing an array of microlenses corresponding to the array of optical fiber ends; and securing the array of microlenses over the planar surface in registration with the core regions of the fiber ends.

6. A hermetic array of optical fibers comprising:

an array of optical fibers, each fiber including an end having a core region and a cladding region peripherally surrounding the core;

a fiber array assembly tube peripherally surrounding the array;

a perforated substrate having a planar surface including an array of perforations for receiving the optical fibers, the surface secured to an end of the assembly tube, and the fibers of the array secured within the perforations of the substrate with the fiber ends coplanar with the planar surface of the substrate; and a patterned hermetic sealing coating disposed over the planar surface and patterned to expose the cores of the fiber ends.

7. The device of claim 6 wherein the end of the assembly tube is planar and the perforated substrate is secured to the end with its planar surface coplanar with the tube end.

8. The device of claim 7 wherein the hermetic sealing coating seals the boundary between the perforated substrate and the assembly tube.

9. The device of claim 6 further comprising an array of microlenses secured over the planar surface with the microlenses in registration with the core regions of the fiber ends.

* * * * *